(12) United States Patent
Yatsu

(10) Patent No.: US 7,303,283 B2
(45) Date of Patent: Dec. 4, 2007

(54) PROJECTION TYPE DISPLAY

(75) Inventor: Masahiko Yatsu, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 217 days.

(21) Appl. No.: 11/302,541

(22) Filed: Dec. 14, 2005

(65) Prior Publication Data
US 2006/0146290 A1 Jul. 6, 2006

(30) Foreign Application Priority Data
Dec. 15, 2004 (JP) .............................. 2004-362186

(51) Int. Cl.
G03B 21/14 (2006.01)
G03B 21/28 (2006.01)
G03B 21/20 (2006.01)
G02F 1/1335 (2006.01)

(52) U.S. Cl. ........................ 353/20; 353/94; 353/98; 353/102; 349/9

(58) Field of Classification Search .................. 353/20, 353/94, 98, 102; 349/9; 348/744; 362/19, 362/257; 359/483, 577, 642
See application file for complete search history.

(56) References Cited

U.S. PATENT DOCUMENTS 6,147,802 A 11/2000 Itoh et al.
2006/0119802 A1* 6/2006 Akiyama ...................... 353/94
2007/0165185 A1* 7/2007 Chen ............................ 353/20

FOREIGN PATENT DOCUMENTS

| JP | 05-034638 | 2/1993 |
|----|-----------|--------|
| JP | 08-234205 | 9/1996 |
| JP | 2001-021996 A | 1/2001 |

* cited by examiner

Primary Examiner—Melissa Jan Koval
(74) Attorney, Agent, or Firm—McDermott Will & Emery LLP

(57) ABSTRACT

A first light-source unit and a second light-source unit are disposed in such a manner that those respective optical axes intersect approximately perpendicularly to each other, a reflective polarizing plate is disposed in the intersecting position of both optical axes at an angle of approximately 45°, a reflecting mirror is disposed approximately parallel with the reflective polarizing plate to reflect two light beams in the same direction on one of first and second optical paths emerging from the reflective polarizing plate, and secondary images of the first and second light-source units formed on each of lens cells of a second lens array plate by a first lens array plate are focused at respective different positions on the same lens cell.

20 Claims, 6 Drawing Sheets

PROJECTION TYPE DISPLAY

CLAIM OF PRIORITY

The present application claims priority from Japanese application serial No. P2004-362186, filed on Dec. 15, 2004, the content of which is hereby incorporated by reference into this application.

FIELD OF THE INVENTION

The present invention relates to a projector which uses an image display device such as a liquid crystal to project an image on a screen, and more specifically to a projection type image display apparatus such as a liquid crystal projector, reflection type image display projector, or projection type rear projection TV set. In particular, the invention relates to a technique that uses a plurality of light-source units.

BACKGROUND OF THE INVENTION

A conventionally known example of a projection type display which projects images displayed on an image display element such as liquid crystal on a screen or the like is the so-called two-light source projection display using two light sources, which is disclosed in for example Japanese Patent Laid-open No. 2001-21996. As shown in FIG. 3 of Japanese Patent Laid-open No. 2001-21996, two light-source units are arranged in opposition to each other and a plurality of, e.g., three, reflective surface elements are arranged between the two light-source units in such a manner that light emitted from the light-source units is reflected by the reflective surfaces and is incident on a plane of incidence of a first lens array plate.

The light beams incident on the first lens array plate form secondary light-source images on corresponding lenses of the second lens array plate, as shown in FIGS. 6 and 7 of Japanese Patent Laid-open No. 2001-21996. The light beam condensed on each lens is then incident on a polarization transforming element (prism array plate) and is separated to p-polarization light and s-polarization light by its polarization separating surface. At the polarization separating surface, the beam of p-polarization light travels straight ahead, while the beam of s-polarization light is reflected. By a reflective surface which follows the beam of s-polarization light is bent its optical path into the same direction as the direction of p-polarized light and is transformed into p-polarization light by a half-wave plate. Then a beam with the direction of polarization regulated to p-polarization is emitted from the polarization transforming element and is directed to a liquid crystal panel.

SUMMARY OF THE INVENTION

In connection with the combined operation of the two light-source units described above in the prior art, the polarization transforming element is of the same construction and has the same operation as in the case of a single light-source unit.

If the construction of the polarization transforming element constituted by a prism array plate can be replaced by a simple construction, it is possible to expect the reduction of cost.

The present invention has been accomplished in view of the above construction of the prior art and it is an object of the invention to provide a projection type display that improves the combining method in the two-light source type to make the use of the prism array plate unnecessary and thereby attain the reduction of cost.

In one aspect of the present invention there is provided a projection type display including: a first light-source unit; a second light-source unit disposed at an approximately perpendicularly intersecting angle relative to an optical axis of the first light-source unit; a reflective polarizing plate disposed in an intersecting position of light beams emitted from both the first and second light-source units at an angle of approximately 45 degrees relative to optical axes of the first and second light-source units; a reflecting mirror disposed approximately parallel with the reflective polarizing plate to reflect light beams outputted from the reflective polarizing plate; first and second lens array plates adapted to make approximately uniform the light beams reflected from the reflective polarizing plate and the reflecting mirror, the first and second lens array plates each including a plurality of lens cells; image display elements adapted to modulate the light beams outputted from the first and second lens array plates into optical images in accordance with video signals; and a projection lens adapted to project as a color image the light beams outputted from the image display units; wherein a secondary light-source image of the first light-source unit and a secondary light-source image of the second light-source unit are formed at respective different positions on one and same lens cell of the second lens array plate.

According to the invention, the projection type display having a plurality of light-source units can attain the reduction of cost because the prism array plate as a polarization transforming element used in the prior art can be omitted.

DETAILED DESCRIPTION OF PREFERRED EMBODIMENTS

Figure 1:
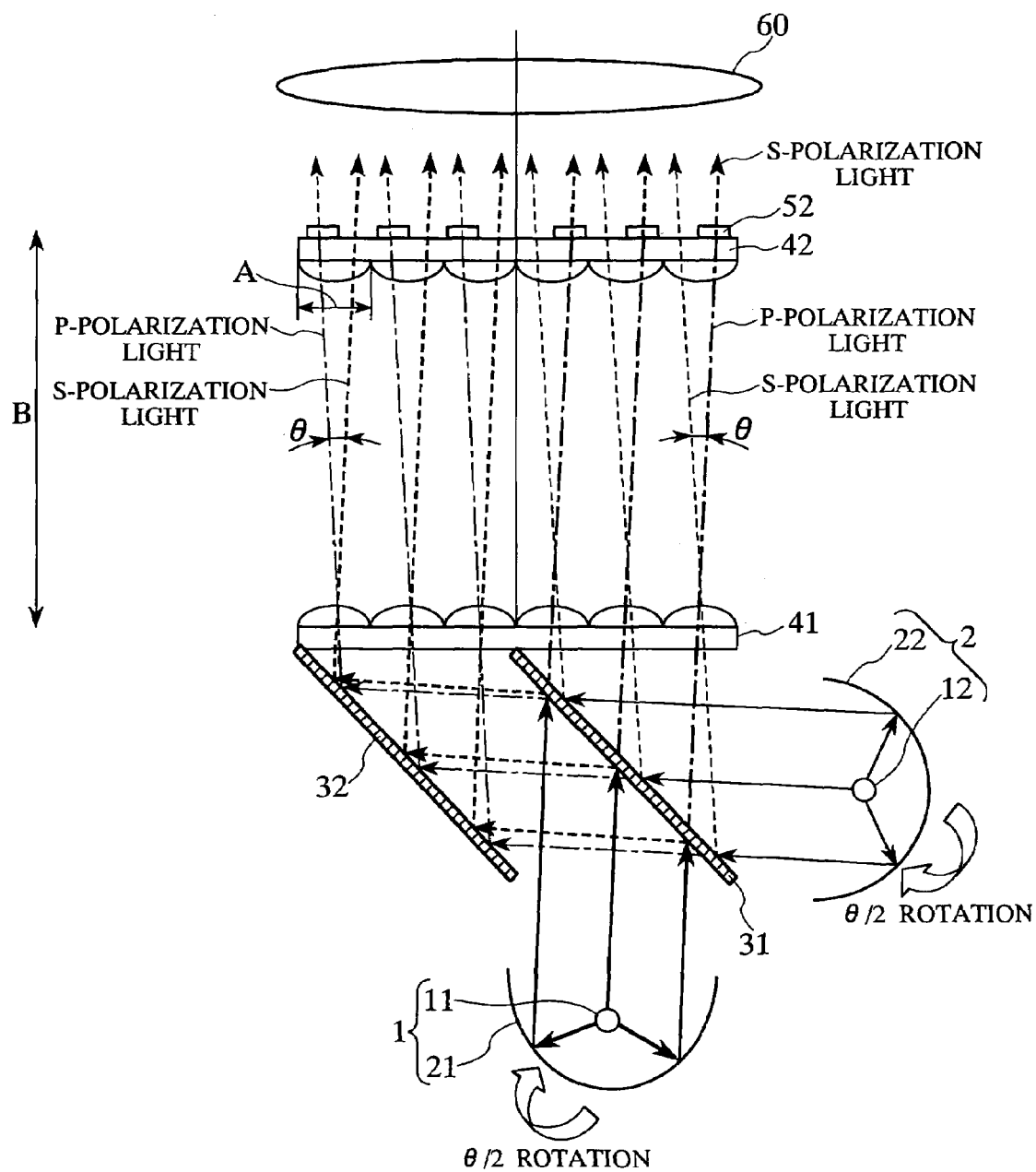
FIG. 1 illustrates a combined operation in a double light-source type according to a first embodiment of the present invention.

A first embodiment of the present invention will be described below with reference to FIGS. 1 and 2.

First, with reference to FIG. 2, the entire configuration of a projection type display according to the first embodiment will be described.

Numeral 1 denotes a first light-source unit, 2 a second light-source unit, 31 a reflective polarizing plate, 32 a reflecting mirror, 41 a first lens array plate, and 42 a second lens array plate.

The first light-source unit 1 is composed of a light source 11 and a paraboloidal reflector 21 and emits a parallel beam of white light. Likewise, the second light-source unit 2 is composed of a light source 12 and a paraboloidal reflector 22 and emits a parallel beam of white light. The light beams emitted from the first and second light-source units 1, 2 are reflected by the reflective polarizing plate 31 and the reflecting mirror 32 and are incident on first lens array plate 41. The light beams incident on the first lens array plate 41 form secondary light-source images at corresponding positions of the second lens array plate 42. Half-wave plates 52 are affixed to predetermined positions of an output surface of the second lens array plate 42 as shown in the figure. The secondary light-source images are superimposed on image display elements 91, 92 and 93 by a focusing lens 60, condenser lenses 81, 82 and relay lenses 83, 84, 85. White light emitted from the focusing lens 60 is separately directed to image display elements 91, 92, 93 corresponding respectively to green, red and blue colors by the action of dichroic mirrors 71, 72 as color separating portions and reflecting mirrors 73, 74, 75 which function to bend optical paths. The green light, red light and blue light outputted from the image display elements 91, 92, 93, respectively, enter a projection lens 105 after color-synthesized by crossed prisms 104. Taking spectral transmittance characteristics of the crossed prisms 104 into account, half-wave plates 102 and 103 are respectively disposed on red and blue light incidence surfaces of the crossed prisms 104 to permit transmission of p-polarization light as it is and reflection after transformation to s-polarization light.

FIG. 1 is a detail view in which the components from the light-source units 1, 2 of the projection type display up to the focusing lens 60 are extracted.

The reflective polarizing plate 31 and the reflecting mirror 32 are disposed at a 45°-direction relative to the first lens array plate 41. The first and second light-source units 1 are each disposed at a position rotated θ/2 in the direction of arrow. How to determine the value of θ will be described later. In FIG. 1, to clear the difference among the following types of light, light rays emitted from the first light-source unit 1 are indicated by thick lines, light rays emitted from the second light-source unit 2 are indicated by thin lines, natural light is indicated by a solid line, s-polarization light is indicated by a broken line, and p-polarization light is indicated by a dot-dash line. Optical elements without a rotation-indicating arrow are each disposed in horizontal, vertical or 45° direction.

In FIG. 1, a parallel light beam is emitted from the light-source unit 1 wherein the light source 11 is disposed at a focal position of the reflector 21 having a paraboloidal reflective surface. Of the white light (natural light) emitted from the first light-source unit 1, the component of p-polarization light passes through the reflecting polarizing plate 31 and is therefore incident on the first lens array plate 41 at an angle of θ/2. The component of s-polarization light is reflected by the reflective polarizing plate 31, then is again reflected by the reflecting mirror 32 and is outputted in the same direction and at the same angle as the component of p-polarization light, that is, it is incident on the first lens array plate 41 at an angle of θ/2.

Likewise, a parallel beam is emitted from the second light-source unit 2 wherein the light source 12 is disposed at a focal position of the reflector 22 having a paraboloidal reflective surface. In the white light (natural light) emitted from the second light-source unit 2, the component of s-polarization light is reflected by the reflective polarizing plate 31 and is therefore incident on the first lens array plate 41 at an angle of θ/2. The component of p-polarization light passes through the reflective polarizing plate 31, then is reflected by the reflecting mirror 32 and is outputted in the same direction and at the same angle as the component of s-polarization light, so that it is incident on the first lens array plate 41 at an angle of θ/2. This light beam angle is in a direction just opposite to that of the light emitted from the first light-source unit 1.

Thus, the p-polarization light emitted from the first light-source unit 1 and the s-polarization light emitted from the second light-source unit 2 are incident on the second lens array plate 42 at an angle difference of θ. Likewise, the s-polarization light emitted from the first light-source unit 1 and the p-polarization light emitted from the second light-source unit 2 are incident on the second lens array plate 42 at an angle difference of θ.

On the other hand, by making the focal length of each lens on the first lens array plate 41 coincident with the distance up to the second lens array plate 42, spot images as secondary light-source images are formed on corresponding lens surfaces of the second lens array plate 42.

In this embodiment, the difference θ between the incident light angle of the light emitted from the first light-source unit 1 and directed on the first lens array plate and the incident light angle of the light emitted from the second light-source unit 2 and directed on the first lens array plate is determined in accordance with the following equation 1. For this determination, the width A of each of the lenses on the first and second lens array plates 41, 42 in a plane including the normal line of the reflective polarizing plate is used. In addition, an optical distance (air-converted length) B from the first lens array plate 41 up to each spot image formed by the first lens array plate is used. In this embodiment, the first and second light-source units 1, 2 are each disposed by half in such a θ/2-rotated state as in FIG. 1.

$$\tan \theta = (A/2)/B \quad \text{(Eq. 1)}$$

At this time, a spot image of the p-polarization light emitted from the first light-source unit 1 and that of the s-polarization light emitted from the second light-source unit 2 are formed on the same lens surface of the second lens array plate 42. Likewise, a spot image of the s-polarization light emitted from the first light-source unit 1 and that of the p-polarization light emitted from the second light-source unit 2 are also formed on the same lens surface of the second lens array plate 42. By satisfying Eq. 1, the spot images of the p-polarization light and those of the s-polarization light can be focused respectively to central positions of bisplit portions of each lens on the second lens array plate 42. By disposing half-wave plates 52 as polarization transforming elements at respective positions where corresponding spot images of p-polarization light are formed out of the above focusing positions, it is possible to effect a polarization transforming operation for regulation into s-polarization light simultaneously with combination in the two-light source type.

Eq. 1 indicates a condition for arranging the spot images of p- and s-polarization light uniformly on each lens surface of the second lens array plate 42. Actual design, however, needs only to satisfy the condition of the following equation 2.

The reason is that if the spot image size is small, it is fully possible to separate the spot images of p- and s-polarization light from each other even if the angle is set to a value smaller than θ defined in Eq. 1. Moreover, if the spot image size is small, two spot images can occupy respective positions on each lens surface even if the angle is set, conversely, to a value larger than θ defined by Eq. 1. In the case where the angle is set to a value smaller than θ defined in Eq. 1, An advantage accrues that the angle of beam emitted from the second lens array plate 42 becomes nearly parallel to the entire optical axis of the optical system.

$$0.8 < (2B/A) \times \tan\theta < 1.2 \quad \text{(Eq. 2)}$$

Thus, unlike the prior art, this embodiment is advantageous in that the use of a prism array plate is not necessary and that the reduction of cost can be attained.

Although in this embodiment the half-wave plates 52 are affixed to the light output side of the second lens array plate 42, the effects of this embodiment can be obtained even by disposing the half-wave plates 52 on the light incidence side of the second lens array plate 42. The half-wave plates 52 can be affixed to the second lens array plate 42 also by reversing the direction of each lens on the second lens array plate 42. In the case where a prism array plate as a polarization transforming element is disposed between the second lens array plate 42 and the focusing lens 60 as in the conventional projection type display, a difference in optical path between p-polarization light and s-polarization light occurs within the prism array plate, which poses a problem with a mapping magnification difference. In contrast therewith, according to this embodiment, there is scarcely any difference in optical path length between p- and s-polarization light because the prism array plate is not necessary in this embodiment. This is also an effect obtained by this embodiment.

In this embodiment, moreover, since the light beams emitted from the light-source units 1 and 2 pass through the entire range of each lens array plate, the lens array plate exhibits an excellent integrator operation. Besides, even if the light source in one light-source unit is turned off, the range of the light beam passing through the dichroic mirror as a succeeding color separating element does not vary and therefore a half-wavelength shift of the dichroic mirror caused by a change in the angle of incidence does not occur.

In this embodiment the half-wave plates 52 as polarization transforming elements are arranged at the respective positions where the corresponding spot images of p-polarization light are formed. However, a subsequent optical layout may permit the half-wave plates 52 to be arranged at the respective positions where the corresponding spot images of s-polarization light are formed, allowing s-polarized light to be outputted in uniformity with p-polarization light. It goes without saying that even such a case can provide the same effects as above.

Although the illustrated reflector is a paraboloidal reflector, it goes without saying that even if an elliptical reflector and a concave lens are combined together and a parallel beam is emitted, there can be obtained the same effects as above.

Figure 2:
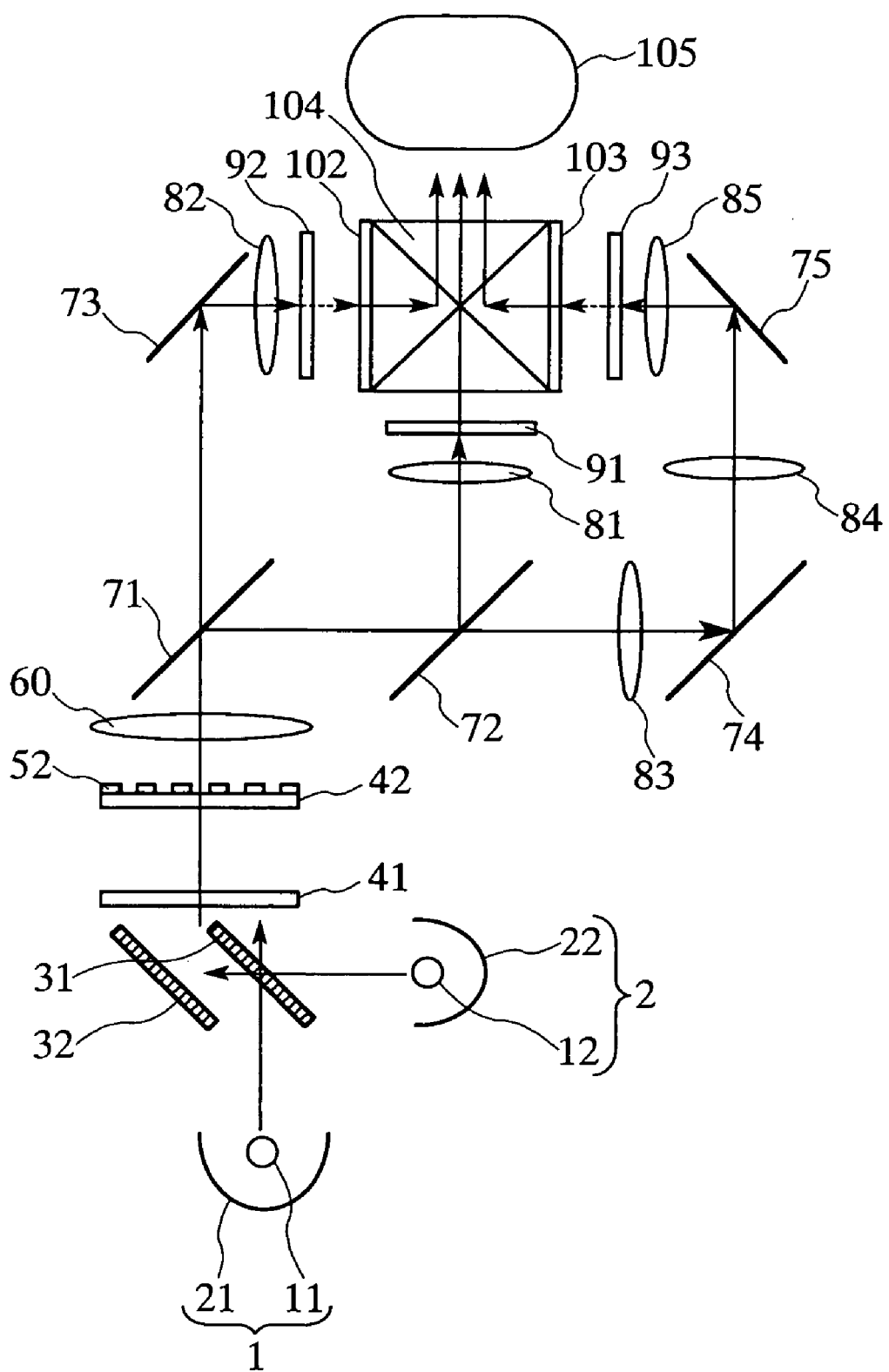
FIG. 2 is a configuration diagram of a projection type display of a double light-source type according to the first embodiment.

While not shown in FIG. 2, an incidence-side polarizing plate and an output-side polarizing plate are disposed respectively in front and rear of each of light valves 91, 92 and 93 to cut off light that is in a state of unnecessary polarization.

Even with a four-light source type, the same effects as above are obtained. In the case of a four-light source type, it is effective to dispose two light sources in a vertically superimposed state in the drawing because the entire beam size after combination can be returned to an approximately square shape which is the same shape as the original shape.

A second embodiment of the present invention will be described below with reference to FIG. 3.

A basic configuration of this second embodiment is the same as that shown in FIG. 1. However, in FIG. 3, first and second light-source units 1, 2 are not rotated, but a reflective polarizing plate 31 and a reflecting mirror 32 are disposed in a θ/2 rotated state.

Figure 3:
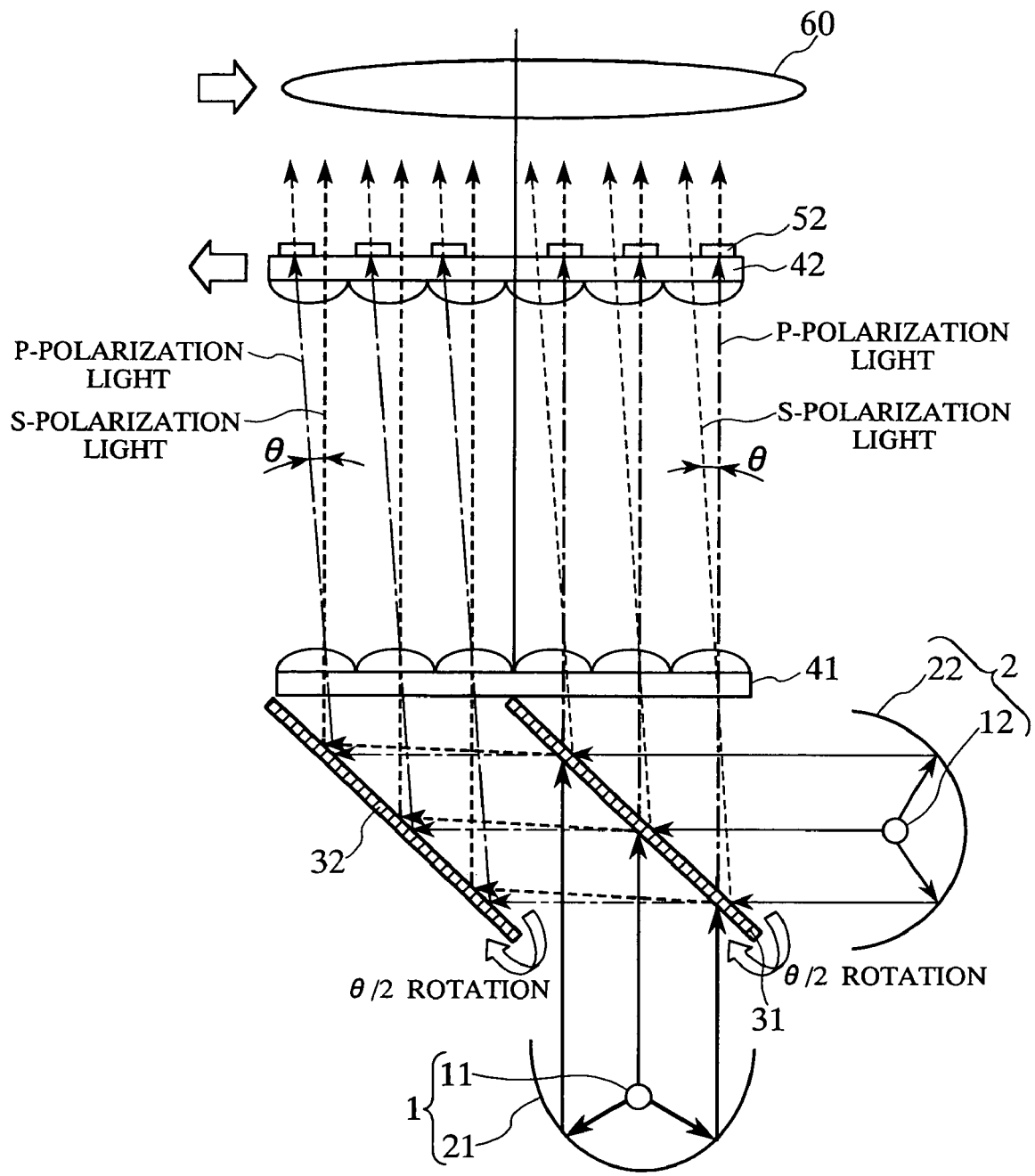
FIG. 3 illustrates a combining operation in a double light-source type according to a second embodiment of the present invention.

In FIG. 3, p-polarization light contained in the natural light emitted from the first light-source unit 1 passes through the reflective polarizing plate 31 and is therefore incident on a first lens array plate 41 at an incidence angle of 0°. S-polarization light is reflected by the reflective polarizing plate 31, then is again reflected by the reflecting mirror 32, is outputted in the same direction and at the same angle as the p-polarization light, and therefore, enters the first lens array plate 41 at an incidence angle of 0°.

On the other hand, s-polarization light contained in the natural light emitted from the second light-source unit 2 is reflected by the reflective polarizing plate 31, so that it is doubled by the reflection and enters the first lens array plate 41 at an incidence angle of θ. P-polarization light passes through the reflective polarizing plate 31, then is reflected by the reflecting mirror 32, and is outputted in the same direction and at the same angle as the s-polarization light, so that it is doubled by the reflection and enters the first lens array plate at an incidence angle of θ.

In this case, a second lens array plate 42 is decentered by an amount corresponding to half of each lens, whereby spot images of p- and s-polarization light are focused separately on the same lens surface of the second lens array plate 42. However, the first and second lens array plates 41, 42 are in a mutually displaced positional relation, so in this state there occurs a displacement of the light quantity distribution (raster) superimposed on the image display elements 91, 92 and 93 using liquid crystal. Therefore, the focusing lens 60 positioned just after the second lens array plate 42 is decentered to correct the displacement. The method for correction of the raster position is not limited to decentering of the focusing lens 60. As shown in FIG. 2, the correction can be made by adjusting the angle of for example the reflecting mirrors disposed in the subsequent optical paths. In such a three-plate type as shown in FIG. 2, however, since an amount of correction common to the three image display elements is used, it is more efficient to make the correction by the focusing lens 60 which is a common optical element.

It is optional which of the angles +θ and −θ is to be adopted insofar as the optical axes of the lenses on the second lens array plate 42 are made coincident with each other in the shift direction.

A third embodiment of the present invention will be described below with reference to FIG. 4.

A basic configuration of this third embodiment is the same as that shown in FIG. 1. However, in FIG. 4, a first light-source unit 1, a reflective polarizing plate 31 and a reflecting mirror 32 are not rotated, but a second light-source unit 2 is disposed in a rotated state by only an angle of θ.

Figure 4:
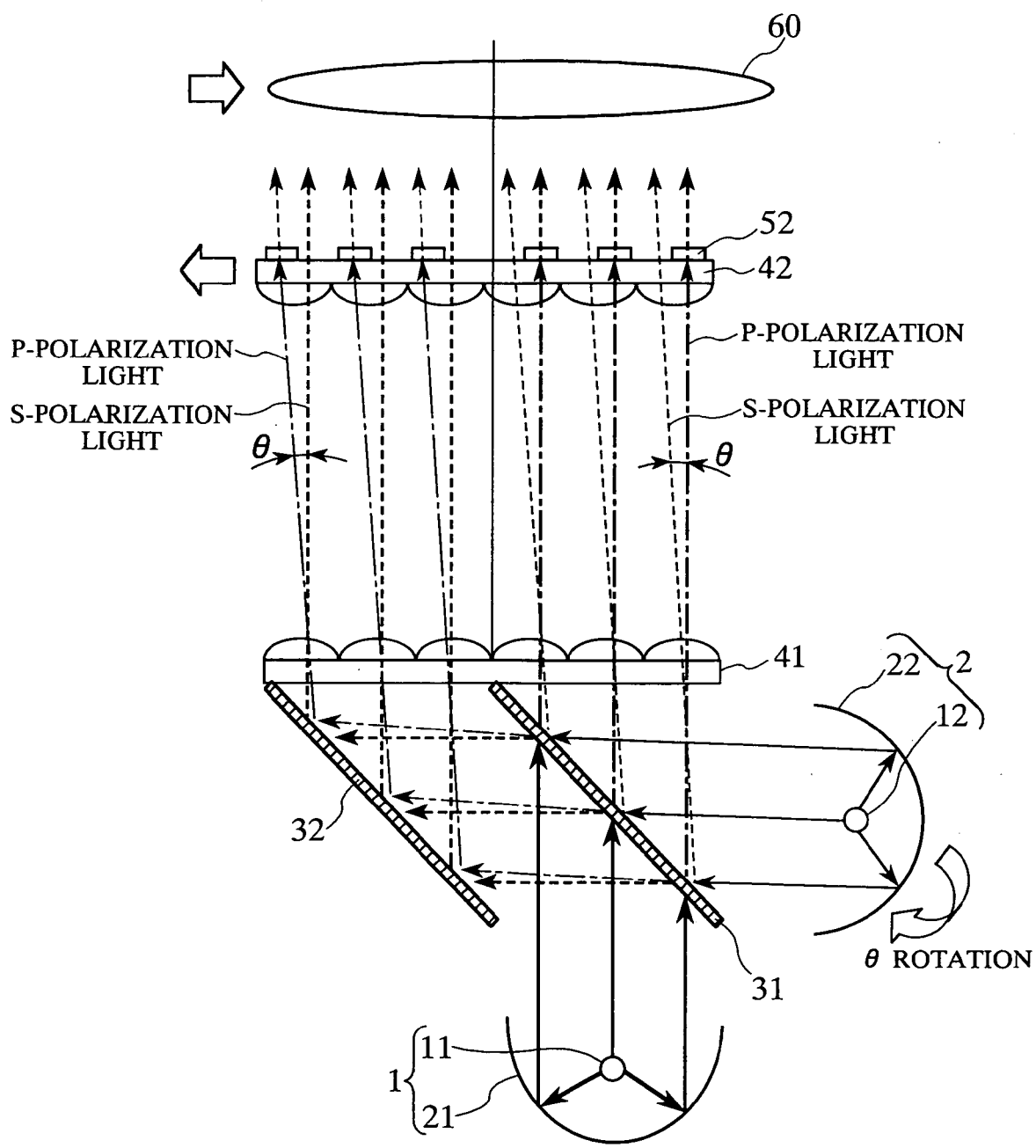
FIG. 4 illustrates a combining operation in a double light-source type according to a third embodiment of the present invention.

In FIG. 4, p-polarization light contained in the natural light emitted from the first light-source unit 1 passes through the reflective polarizing plate 31 and is therefore incident on a first lens array plate 41 at an incidence angle of 0°. S-polarization light is reflected by the reflective polarizing plate 31, then is again reflected by the reflecting mirror 32 and is outputted in the same direction and at the same angle as the p-polarization light, so that it is incident on the first lens array plate 41 at an incidence angle of 0°.

On the other hand, s-polarization light contained in the natural light emitted from the second light-source unit 2 is reflected by the reflective polarizing plate 31 and is therefore incident on the first lens array plate 41 at an incidence angle of θ. P-polarization light passes through the reflective polarizing plate 31, then is reflected by the reflecting mirror 32 and is outputted in the same direction and at the same angle as the s-polarization light, so that it is incident on the first lens array plate 41 at an incidence angle of θ.

In this case, the second lens array plate 42 is decentered by an amount corresponding to half of each lens, whereby spot images of p- and s-polarization light are focused separately on the same lens surface of the second lens array plate 42. However, the first and second lens array plates 41, 42 are in a mutually displaced positional relation, so that in this state the light quantity distribution superimposed on the image display elements 91, 92 and 93 using a liquid crystal is displaced. Therefore, the focusing lens 60 positioned just after the second lens array plate 42 is decentered to correct the displacement.

Even if the second light-source unit 2 is disposed without rotation and instead the first light-source unit 1 is disposed in a rotated state by θ, the same effects as above can be provided.

A fourth embodiment of the present invention will be described below with reference to FIG. 5.

A basic configuration of this fourth embodiment is the same as that shown in FIG. 1. However, in FIG. 5, first and second light-source units 1, 2 are not rotated, but a reflective polarizing plate 31 and a reflecting mirror 32 are rotated by only an angle of θ/2.

Figure 5:
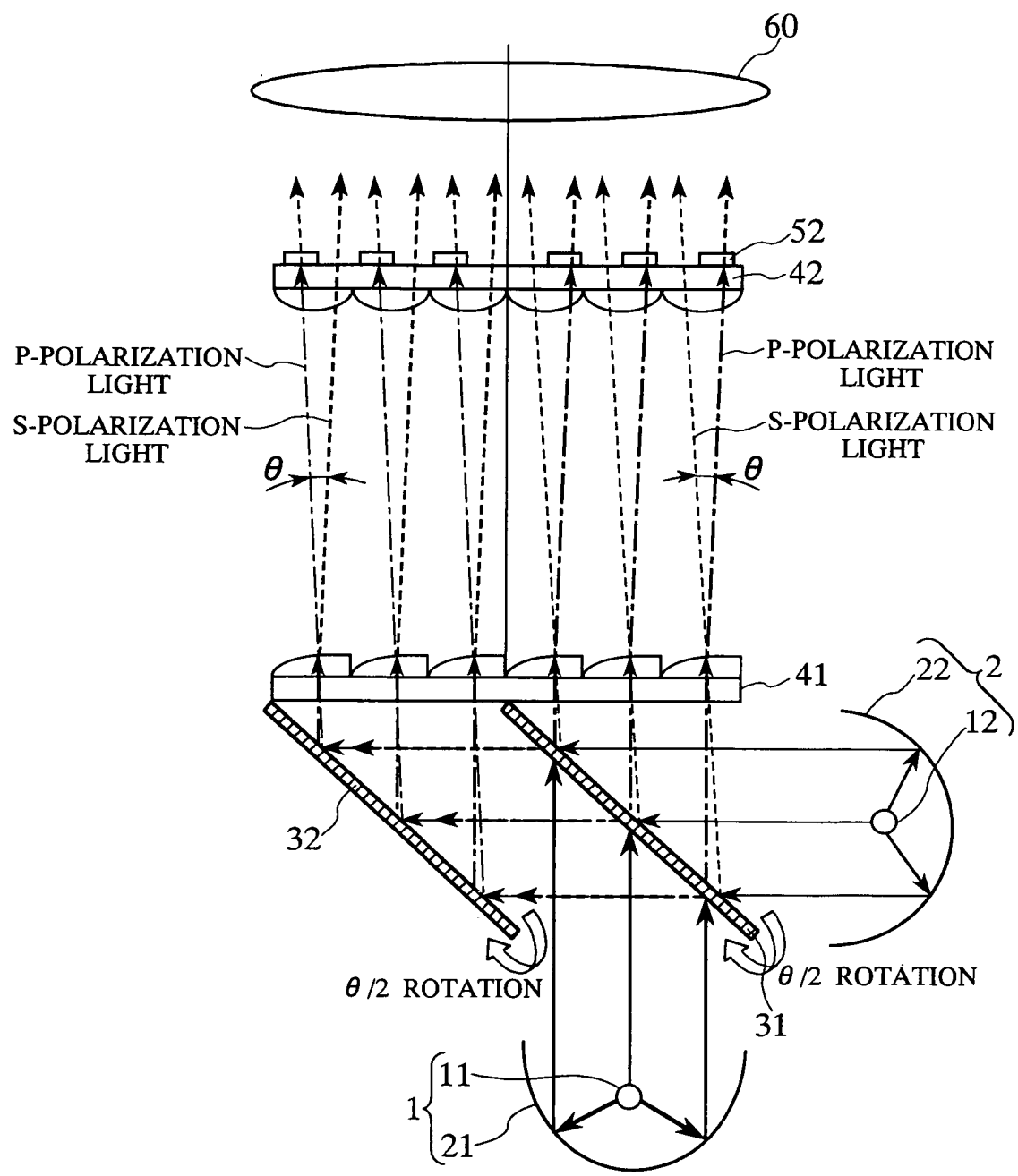
FIG. 5 illustrates a combining operation in a double light-source type according to a fourth embodiment of the present invention.

In FIG. 5, p-polarization light contained in the natural light emitted from the first light-source unit 1 passes through the reflective polarizing plate 31 and is therefore incident on a first lens array plate 41 at an incidence angle of 0°. S-polarization light is reflected by the reflective polarizing plate 31, then is again reflected by the reflecting mirror 32 and is outputted in the same direction and at the same angle as the p-polarization light, so that it is incident on the first lens array plate 41 at an incidence angle of 0°.

On the other hand, s-polarization light contained in the natural light emitted from the second light-source unit is reflected by the reflective polarizing plate 31, so that it is doubled by the reflection and is incident on the first lens array plate 41 at an incidence angle of θ. P-polarization light passes through the reflective polarizing plate 31, then is reflected by the reflecting mirror 32 and is outputted in the same direction and at the same angle as the s-polarization light, so that it is doubled by the reflection and is incident on the first lens array plate 41 at an incidence angle of θ.

In this case, by decentering the optical axis of each lens on the first lens array plate 41, spot images of p- and s-polarization light are focused separately on the same lens surface of the second lens array plate 42.

It is optional which of +θ and −θ is to be adopted insofar as the optical axes of the lenses on the first lens array plate 41 are made coincident with each other in the shift direction.

A fifth embodiment of the present invention will be described below with reference to FIG. 6.

A basic configuration of this fifth embodiment is the same as that shown in FIG. 1. However, in FIG. 6, a first light-source unit 1, a reflective polarizing plate 31 and a reflecting mirror 32 are not rotated, but a second light-source unit 2 is rotated by only an angle of θ.

Figure 6:
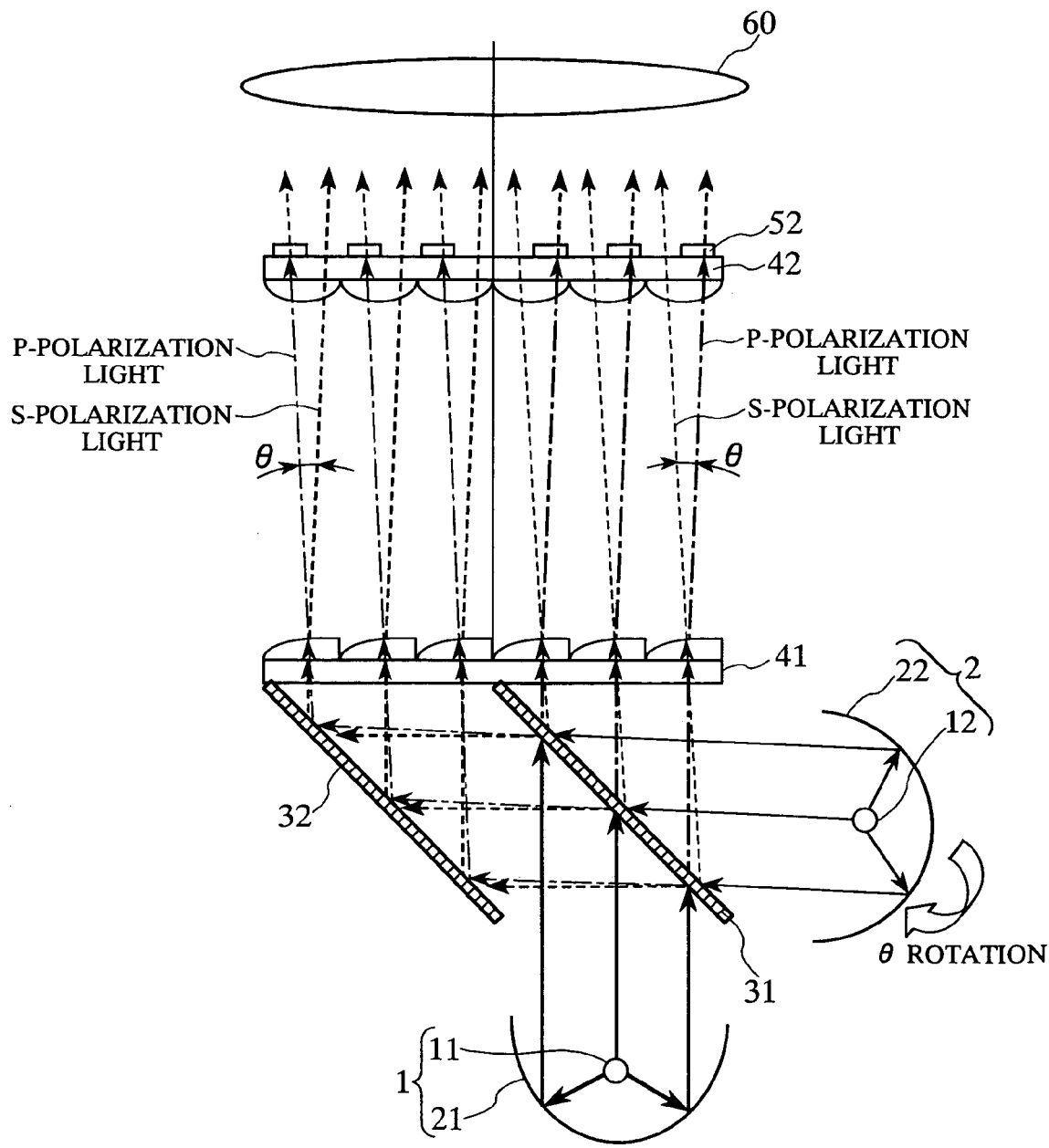
FIG. 6 illustrates a combining operation in a double light-source type according to a fifth embodiment of the present invention.

In FIG. 6, p-polarization light contained in the natural light emitted from the first light-source unit 1 passes through the reflective polarizing plate 31 and is therefore incident on the first lens array plate 41 at an incidence angle of 0°. S-polarization light is reflected by the reflective polarizing plate 31, then is again reflected by the reflecting mirror 32 and is outputted in the same direction and at the same angle as the p-polarization light, so that it is incident on the first lens array plate 41 at an incidence angle of 0°.

On the other hand, s-polarization light contained in the natural light emitted from the second light-source unit 2 is reflected by the reflective polarizing plate 31 and is therefore incident on the first lens array plate 41 at an incidence angle of θ. P-polarization light passes through the reflective polarizing plate 31, then is reflected by the reflecting mirror 32 and is outputted in the same direction and at the same angle as the s-polarization light, so that it is incident on the first lens array plate at an incidence angle of θ.

In this case, by decentering the optical axis of each lens on the second lens array plate 42, spot images of p- and s-polarization light are focused separately on the same lens surface of the second lens array plate 42.

Even if the second light-source unit 2 is not rotated and instead the first light-source unit 1 is rotated by an angle of θ, the same effects as above can be provided.

What is claimed is:

1. A projection type display comprising:
   a first light-source unit;
   a second light-source unit disposed at an approximately perpendicularly intersecting angle relative to an optical axis of said first light-source unit;
   a reflective polarizing plate disposed in an intersecting position of light beams emitted from both said first and second light-source units at an angle of approximately 45 degrees relative to optical axes of said first and second light-source units;
   a reflecting mirror disposed approximately parallel with said reflective polarizing plate to reflect light beams outputted from the reflective polarizing plate;
   first and second lens array plates adapted to make approximately uniform the light beams reflected from said reflective polarizing plate and said reflecting mirror, said first and second lens array plates each including a plurality of lens cells;
   image display elements adapted to modulate the light beams outputted from said first and second lens array plates into optical images in accordance with video signals; and
   a projection lens adapted to project as a color image the light beams outputted from said image display units;
   wherein a secondary light-source image of said first light-source unit and a secondary light-source image of said second light-source unit are formed at respective different positions on one and same lens cell of said second lens array plate.

2. The projection type display according to claim 1, wherein the angle of an optical axis of said first light-source unit incident on said first lens array plate and the angle of an optical axis of said second light-source unit incident on said first lens array plate are different from each other.

3. The projection type display according to claim 1, wherein the light beams emitted from said first and second light-source units are each separated to a p-polarization light beam and an s-polarization light beam by said reflective polarizing plate, and
   polarization transforming elements are disposed respectively at focused positions of said secondary light-source images to change the polarization direction of either the p-polarization light beam or the s-polarization light beam.

4. The projection type display according to claim 3, wherein said polarization transforming elements are disposed on said image display elements side of said second lens array plate.

5. The projection type display according to claim 4, wherein said polarization transforming elements are half-wave plates.

6. The projection type display according to claim 3, wherein said polarization transforming elements are disposed on said first lens array side of said second lens array plate.

7. The projection type display according to claim 6, wherein said polarization transforming elements are half-wave plates.

8. The projection type display according to claim 1, wherein if the angle between the light beam emitted from said first light-source unit and directed to said first lens array plate and the light beam emitted from said second light-source unit and directed to said first lens array plate is assumed to be θ, the angle between a normal line direction of a polarization separating surface of said reflective polarizing plate and an optical axis direction of said first lens array plate is approximately 45 degrees, the angle between the normal line direction of the polarization separating surface of said reflective polarizing plate and an optical axis of either said first or said second optical light-source unit is approximately 45 degrees+θ/2, and the angle between the normal line direction of the polarization separating surface of said reflective polarizing plate and an optical axis of the other light-source unit is approximately 45 degrees−θ/2.

9. The projection type display according to claim 1, wherein if the angle between the light beam emitted from said first light-source unit and directed to said first lens array plate and the light beam emitted from said second light-source unit and directed to said first lens array plate is assumed to be θ, the angle between a normal line direction of a polarization separating surface of said reflective polarizing plate and an optical axis direction of said first lens array plate is approximately 45 degrees+θ/2 or −θ/2, and an optical axis of either said first or said second light-source unit is approximately perpendicular to the optical axis of said first lens array plate and an optical axis of the other light-source unit is approximately parallel to the optical axis of said first lens array plate.

10. The projection type display according to claim 9, wherein optical axes of plural lens cells on said first lens array plate are decentered relative to the centers of plural lens cells on said second lens array plate.

11. A projection type display including a first light-source unit, a second light-source unit, said first and second light-source units being disposed in such a manner that respective optical axes intersect approximately perpendicularly to each other, image display elements adapted to modulate light beams emitted from said first and second light-source units into optical images in accordance with video signals, and a projection lens adapted to project as a color image the light beams outputted from said image display elements, said projection type display comprising:

a reflective polarizing plate disposed in an intersecting position of the optical axes of said first and second light-source units at an angle of approximately 45 degrees relative to the optical axes of said first and second light-source units;

a reflecting mirror disposed approximately parallel with said reflective polarizing plate to reflect light beams outputted from the reflective polarizing plate; and first and second lens array plates comprising a plurality of lens cells and adapted to make uniform the illuminance of light beams outputted from said reflective polarizing plate and said reflecting mirror;

wherein a secondary light-source image of said first light-source unit and a secondary light-source image of said second light-source unit are formed at respective different positions on one and same lens cell of said second lens array plate.

12. The projection type display according to claim 11, wherein the angle of an optical axis of said first light-source unit incident on said first lens array plate and the angle of an optical axis of said second light-source unit incident on said first lens array plate are different from each other.

13. The projection type display according to claim 11, wherein the light beams emitted from said first and second light-source units are each separated to a p-polarization light beam and an s-polarization light beam by said reflective polarizing plate, and polarization transforming elements are disposed respectively at focused positions of said secondary light-source images to change the polarization direction of either the p-polarization light beam or the s-polarization light beam.

14. The projection type display according to claim 13, wherein said polarization transforming elements are disposed on said image display elements side of said second lens array plate.

15. The projection type display according to claim 14, wherein said polarization transforming elements are half-wave plates.

16. The projection type display according to claim 13, wherein said polarization transforming elements are disposed on said first lens array side of said second lens array plate.

17. The projection type display according to claim 16, wherein said polarization transforming elements are half-wave plates.

18. The projection type display according to claim 11, wherein if the angle between the light beam emitted from said first light-source unit and directed to said first lens array plate and the light beam emitted from said second light-source unit and directed to said first lens array unit is assumed to be θ, the angle between a normal line direction of a polarization separating surface of said reflective polarizing plate and an optical axis direction of said first lens array plate is approximately 45 degrees, the angle between the normal line direction of the polarization separating surface of said reflective polarizing plate and an optical axis of either said first or said second light-source unit is approximately 45 degrees+θ/2, and the angle between the normal line direction of the polarization separating surface of said reflective polarizing plate and an optical axis of the other light-source unit is approximately 45 degrees−θ/2.

19. The projection type display according to claim 11, wherein if the angle between the light beam emitted from said first light-source unit and directed to said first lens array plate and the light beam emitted from said second light-source unit and directed to said first lens array plate is assumed to be θ, the angle between a normal line direction of a polarization separating surface of said reflective polarizing plate and an optical axis direction of said first lens array plate is approximately 45 degrees+θ/2 or −θ/2, and an optical axis of either said first or said second light-source unit is approximately perpendicular to the optical axis of said first lens array plate and an optical axis of the other light-source unit is approximately parallel to the optical axis of said first lens array plate.

20. A projection type display according to claim 19, wherein optical axes of plural lens cells on said first lens array plate are decentered relative to the centers of plural lens cells on said second lens array plate.

* * * * *